United States Patent
Park

(10) Patent No.: US 9,006,947 B2
(45) Date of Patent: Apr. 14, 2015

(54) SPINDLE MOTOR

(75) Inventor: Young Ha Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 202 days.

(21) Appl. No.: 13/605,624

(22) Filed: Sep. 6, 2012

(65) Prior Publication Data

US 2013/0140931 A1    Jun. 6, 2013

(30) Foreign Application Priority Data

Dec. 5, 2011   (KR) .................. 10-2011-0129021

(51) Int. Cl.
  *H02K 5/16*   (2006.01)
  *F16C 17/10*   (2006.01)
  *G11B 19/20*   (2006.01)
  *H02K 7/08*   (2006.01)

(52) U.S. Cl.
  CPC .......... *F16C 17/107* (2013.01); *G11B 19/2036* (2013.01); *H02K 7/086* (2013.01)

(58) Field of Classification Search
  CPC ............................ H02K 5/1677; H02K 5/165
  USPC ...... 310/90, 91, 40 MM, 67 R; 384/119, 107, 384/100, 113, 114, 115
  See application file for complete search history.

(56) References Cited

U.S. PATENT DOCUMENTS

| | | | |
|---|---|---|---|
| 6,493,181 B1 * | 12/2002 | Ichiyama | ................... 360/99.08 |
| 7,654,742 B2 | 2/2010 | Nishimoto et al. | |
| 2002/0025090 A1 * | 2/2002 | Sakatani et al. | ............... 384/107 |
| 2005/0207060 A1 * | 9/2005 | Leblanc et al. | ............ 360/99.08 |
| 2006/0147135 A1 * | 7/2006 | Kim | .............................. 384/107 |

FOREIGN PATENT DOCUMENTS

JP     2000283154 A   * 10/2000
KR   10-2006-0079630       7/2006

OTHER PUBLICATIONS

Iwaki et al. (JP 2000283154 A)(Oct. 2000)(English Translation).*

* cited by examiner

*Primary Examiner* — Quyen Leung
*Assistant Examiner* — Robert E Mates

(57) ABSTRACT

There is provided a spindle motor including: a base part including a base member and a lower thrust member fixedly installed on the base member; a shaft having a lower end portion fixedly installed on the base part; an upper thrust member fixedly installed on an upper end portion of the shaft; a sleeve disposed between the upper and lower thrust members and rotatably installed on the shaft; and a rotor hub fixedly installed on the sleeve to thereby rotate together therewith, wherein the sleeve includes a connection hole formed therein in order to connect an inner diameter portion thereof to an outer peripheral surface thereof.

6 Claims, 6 Drawing Sheets

SPINDLE MOTOR

CROSS-REFERENCE TO RELATED APPLICATIONS

This application claims the priority of Korean Patent Application No. 10-2011-0129021 filed on Dec. 5, 2011, in the Korean Intellectual Property Office, the disclosure of which is incorporated herein by reference.

BACKGROUND OF THE INVENTION

1. Field of the Invention

The present invention relates to a spindle motor.

2. Description of the Related Art

A shaft fixing type spindle motor in which a shaft having strong impact resistance is fixed to a case of a hard disk driving device is generally mounted in an information recording and reproducing device such as a hard disk driving device for a server.

That is, the shaft is fixedly installed in the spindle motor mounted in the hard disk driving device for a server in order to prevent information recorded in the server from being damaged and becoming unreproducible or unreadable due to an external impact.

Meanwhile, since it is necessary for a spindle motor used for a hard disk driving device to have high reliability, maintenance of a certain amount of a lubricating fluid within a fluid dynamic bearing assembly including a fixing type shaft is required.

In addition, there is a need to develop a structure capable of managing an interface between the lubricating fluid and air so as to reduce the possibility of the fluid dynamic bearing assembly insufficiently or excessively filled with the lubricating fluid.

Further, there is a need to develop a structure capable of suppressing the lubricating fluid from being separated from a bearing clearance at the time of an external impact in order to stably maintain an amount of the lubricating fluid filling the fluid dynamic bearing assembly.

SUMMARY OF THE INVENTION

An aspect of the present invention provides a spindle motor capable of managing a position at which an interface between a lubricating fluid and air is formed.

Another aspect of the present invention provides a spindle motor capable of suppressing a lubricating fluid from being separated from a bearing clearance at the time of an external impact thereto.

According to an aspect of the present invention, there is provided a spindle motor including: a base part including a base member and a lower thrust member fixedly installed on the base member; a shaft having a lower end portion fixedly installed on the base part; an upper thrust member fixedly installed on an upper end portion of the shaft; a sleeve disposed between the upper and lower thrust members and rotatably installed on the shaft; and a rotor hub fixedly installed on the sleeve to thereby rotate together therewith, wherein the sleeve includes a connection hole formed therein in order to connect an inner diameter portion thereof to an outer peripheral surface thereof.

The shaft may include a depression groove recessed in a central portion of an outer peripheral surface thereof in a circumferential direction, the depression groove having upper and lower inclined surfaces provided in upper and lower portions thereof.

The sleeve may form upper and lower bearing clearances together with the shaft and the upper and lower thrust members, and the sleeve may have upper and lower inclined portions provided in upper and lower portions of the outer peripheral surface thereof so as to form respective liquid-vapor interfaces together with the upper and lower thrust members.

The connection hole may be inclined so as to connect a clearance formed by the upper inclined surface and the sleeve to a clearance formed by the upper inclined portion of the sleeve and the upper thrust member.

The connection hole may be inclined, such that one end thereof may be disposed below a liquid-vapor interface formed in a space formed by the upper thrust member and the upper inclined portion of the sleeve, and the other end thereof may be disposed above a liquid-vapor interface formed in a space formed by the upper inclined surface and the sleeve.

The sleeve may include a communication hole formed therein in order to allow a space formed by the depression groove and the shaft to be in communication with the outside of the sleeve.

The lower thrust member may include a disk part provided with an installation hole into which the shaft is inserted and an extension part extended from the disk part, and the extension part may have a through-hole formed therein in order to insert a lubricating fluid therethrough.

According to another aspect of the present invention, there is provided a spindle motor including: a base part including a base member and a lower thrust member fixedly installed on the base member; a shaft having a lower end portion fixedly installed on the base part; an upper thrust member fixedly installed on an upper end portion of the shaft; a sleeve disposed between the upper and lower thrust members, rotatably installed on the shaft, and forming upper and lower bearing clearances together with the shaft; and a rotor hub fixedly installed on the sleeve to thereby rotate together therewith, wherein the sleeve includes a connection hole formed therein in order to connect an inner diameter portion thereof to an outer peripheral surface thereof, and the lower thrust member includes a through-hole formed therein in order to control an interface between a lubricating fluid and air.

The sleeve may include a communication hole formed therein in order to allow a space formed by a depression groove and the shaft to be in communication with the outside of the sleeve.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, or removal of components within the same spirit, but those are construed as being included in the spirit of the present invention.

Further, when it is determined that a detailed description of known art related to the present invention may obscure the present invention, a detailed description thereof will be omitted.

Figure 1:
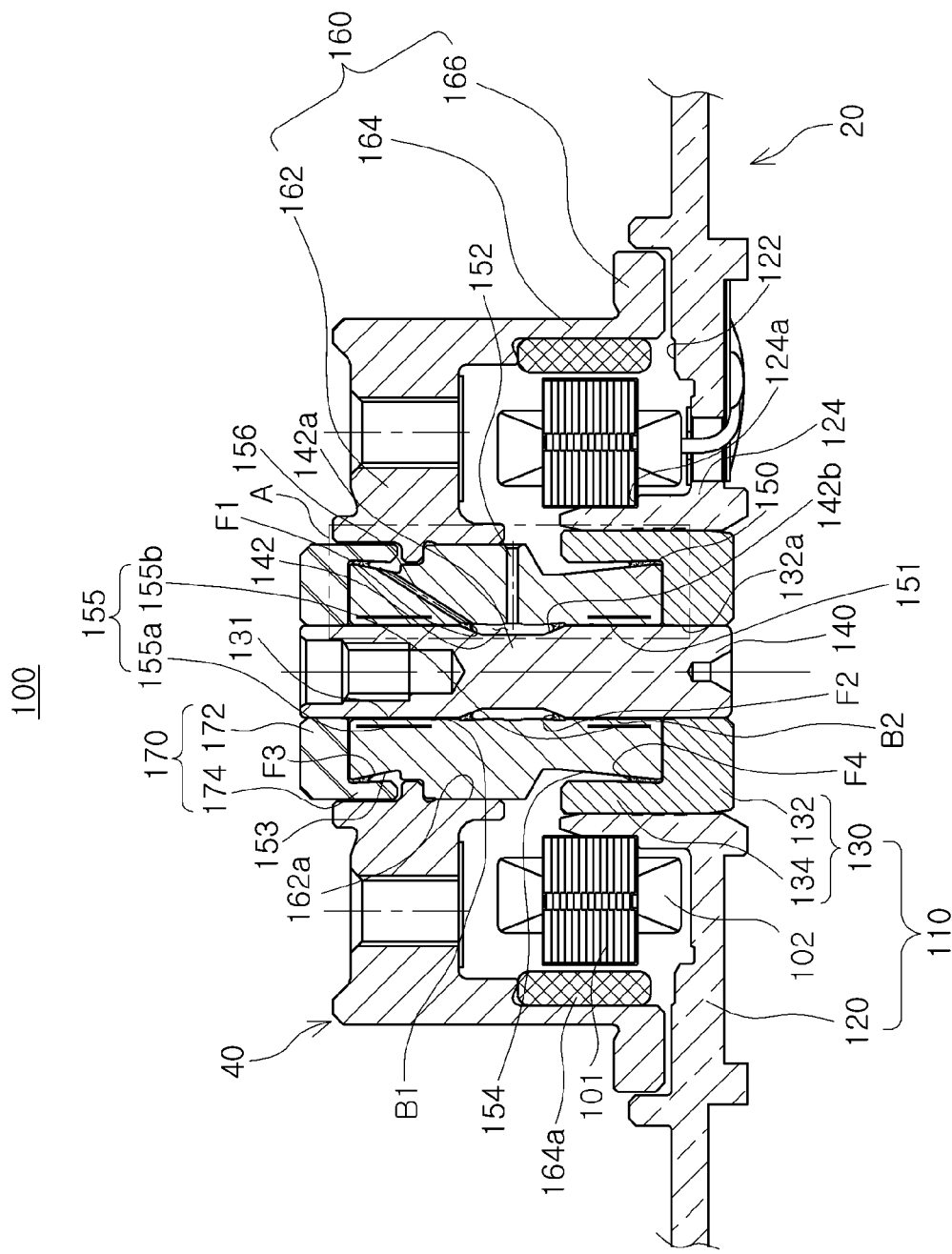
FIG. 1 is a schematic cross-sectional view showing a spindle motor according to an embodiment of the present invention.
Figure 2:
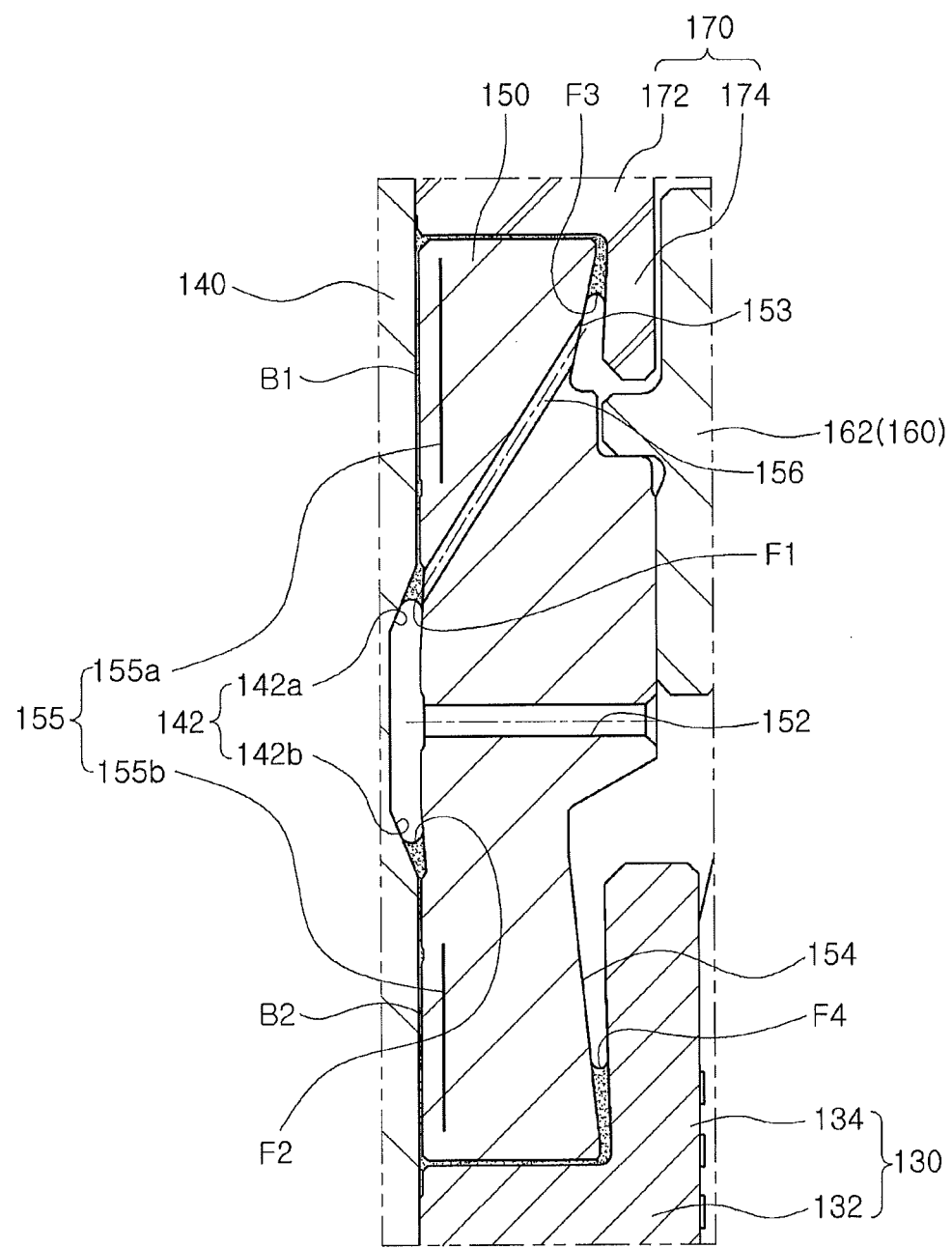
FIG. 2 is an enlarged view showing part A of FIG. 1.

FIG. 1 is a cross-sectional view schematically showing a spindle motor according to an embodiment of the present invention, and FIG. 2 is an enlarged view showing part A of FIG. 1.

Referring to FIGS. 1 and 2, a spindle motor 100 according to an embodiment of the present invention may include a base part 110 including a base member 120 and a lower thrust member 130, a shaft 140, a sleeve 150, a rotor hub 160, and an upper thrust member 170.

Meanwhile, the spindle motor 100 may be a motor used in an information recording and reproducing device such as a hard disk driving device for a server, or the like.

In addition, the spindle motor 100 according to the embodiment of the present invention may be mainly configured of a stator 20 and a rotor 40.

The stator 20, referring to all fixed members with the exception of a rotating member, may include the base member 120, the lower thrust member 130, the shaft 140, the upper thrust member 170, a stator core 102, and the like.

In addition, the rotor 40, referring to members rotating based on the shaft 140, may include the sleeve 150, the rotor hub 160, and the like.

Here, terms with respect to directions will be defined. As viewed in FIG. 1, an axial direction refers to a vertical direction, that is, a direction from a lower portion of the shaft 140 toward an upper portion thereof or a direction from the upper portion of the shaft 140 toward the lower portion thereof, and a radial direction refers to a horizontal direction, that is, a direction from the shaft 140 toward an outer peripheral surface of the rotor hub 160 or from the outer peripheral surface of the rotor hub 160 toward shaft 140.

In addition, a circumferential direction refers to a direction rotating along the outer peripheral surface of the rotor hub 160.

The base part 110 may include the base member 120 and the lower thrust member 130 fixedly installed on the base member 120.

The base member 120 may include a mounting groove 122 so as to form a predetermined space together with the rotor hub 160. In addition, the base member 120 may include a coupling part 124 extended upwardly in the axial direction and having the stator core 102 installed on an outer peripheral surface thereof.

In addition, the coupling part 124 may include a seat surface 124a provided on an outer peripheral surface thereof so that the stator core 102 may be seated and installed thereon. Further, the stator core 102 seated on the coupling part 124 may be disposed above the mounting groove 122 of the base member 120.

The lower thrust member 130 may be fixedly installed on the base member 120. That is, the lower thrust member 130 may be insertedly installed in the coupling part 124. More specifically, an outer peripheral surface of the lower thrust member 130 may be bonded to an inner peripheral surface of the coupling part 124.

Meanwhile, the lower thrust member 130 may include a disk part 132 having an inner surface fixedly installed on the shaft 140 and an outer surface fixedly installed on the base member 120 and an extension part 134 extended upwardly from the disk part 132 in the axial direction.

That is, the lower thrust member 130 may have a cup shape having a hollow part and may have a 'L' shaped cross section.

In addition, the disk part 132 may be provided with an installation hole 132a for installing the shaft 140, and the shaft 140 may be insertedly mounted in the installation hole 132a.

In addition, the lower thrust member 130 may be included, together with the base member 120, in the fixed member, that is, the stator 20.

Meanwhile, the outer surface of the lower thrust member 130 may be bonded to the inner surface of the base member 120 by using an adhesive and/or welding. In other words, the outer surface of the lower thrust member 130 may be fixedly bonded to the inner surface of the coupling part 124 of the base member 120.

In addition, a thrust dynamic pressure generating groove (not shown) for generating thrust fluid dynamic pressure may be formed in at least one of an upper surface of the lower thrust member 130 and a lower surface of the sleeve 150.

Further, the lower thrust member 130 may also serve as a sealing member for preventing lubricating fluid from being leaked.

The shaft 140 may have a lower end portion fixedly installed on the base part 110, and may include a depression groove 142 recessed in a central portion of an outer peripheral surface thereof in the circumferential direction and having upper and lower inclined surfaces 142a and 142b provided in upper and lower portions of the depression groove. That is, the lower end portion of the shaft 140 may be inserted into the installation hole 132a formed in the disk part 132 of the lower thrust member 130.

In addition, the lower end portion of the shaft 140 may be bonded to an inner surface of the disk part 132 by using an adhesive and/or welding. Therefore, the shaft 140 may be fixed thereto.

Further, although the present embodiment describes a case in which the shaft 140 is fixedly installed on the lower thrust member 130, the present invention is not limited thereto. That is, the shaft 140 may also be fixedly installed on the base member 120.

Meanwhile, the shaft 140 may be also included, together with the lower thrust member 130 and the base member 120, in the fixed member, that is, the stator 20.

In addition, the depression groove 142 may be recessed from the outer peripheral surface of the shaft to thereby allow a lubricating fluid to fill upper and lower bearing clearances B1 and B2. That is, an interface (that is, a liquid-vapor interface) between the lubricating fluid and air may be formed in the clearances formed by the inclined surfaces 142a and 142b of the upper and lower portions of the depression groove 142 and an inner peripheral surface of the sleeve 150.

Therefore, the upper and lower bearing clearances may be separately filled with the lubricating fluid.

A detailed description thereof will be provided below.

The sleeve 150 may be rotatably installed on the shaft 140. To this end, the sleeve 150 may include a shaft hole 151 into which the shaft 140 is inserted. Meanwhile, in the case in which the sleeve 150 is installed on the shaft 140, the inner peripheral surface of the sleeve 150 and the outer peripheral surface of the shaft 140 are disposed to be spaced apart from each other by a predetermined interval to thereby form the bearing clearances B1 and B2 therebetween.

In addition, the bearing clearances B1 and B2 are filled with the lubricating fluid.

More specifically, the bearing clearance may be configured of the upper bearing clearance B1 and the lower bearing clearance B2. Here, the upper bearing clearance B1 means a space formed by an upper end portion of the shaft 140 and an upper end portion of the sleeve 150 and a space formed by the upper end portion of the sleeve 150 and the upper thrust member 170.

Further, the lower bearing clearance B2 means a space formed by a lower end portion of the shaft 140 and a lower end portion of the sleeve 150 and a space formed by the lower end portion of the sleeve 150 and the lower thrust member 130.

Meanwhile, the depression groove 142 formed in the shaft 140 may serve to form an interface between air and the lubricating fluid filling each of the upper bearing clearance B1 and the lower bearing clearance B2.

That is, an upper portion of the depression groove 142, that is, the upper inclined surface 142a may be provided with an interface between the air and the lubricating fluid filling the upper bearing clearance B1, that is, a first liquid-vapor interface F1. In addition, a lower portion of the depression groove 142, that is, the lower inclined surface 142b may be provided with an interface between the air and the lubricating fluid filling the lower bearing clearance B2, that is, a second liquid-vapor interface F2.

That is, the depression groove 142 may have the upper and lower inclined surfaces 142a and 142b such that the first and second liquid-vapor interfaces F1 and F2 may be formed by a capillary phenomenon.

In addition, the sleeve 150 may include a communication hole 152 disposed to face the depression groove 142 to thereby allow a space formed by the depression groove 142 and the sleeve 150 to be in communication with the outside of the sleeve 150. That is, the communication hole 152 for allowing pressure of the space formed by the depression groove 142 and the sleeve 150 to be equal to that of the outside of the sleeve 150 may be formed in the sleeve 150 such that the first and second liquid-vapor interfaces F1 and F2 may be formed as described above.

Meanwhile, the sleeve 150 may have an upper inclined portion 153 formed in an upper end portion thereof so as to form a liquid-vapor interface together with the upper thrust member 170, and the upper inclined portion 153 has a larger outer diameter in an upper portion thereof than in a lower portion thereof.

In other words, the upper end portion of the sleeve 150 may be provided with the upper inclined portion 153 having a larger outer diameter in the upper portion thereof than in the lower portion thereof such that a third liquid-vapor interface F3 may be formed in a space between an outer peripheral surface of the sleeve 150 and an inner peripheral surface of the upper thrust member 170.

Therefore, the lubricating fluid filling the upper bearing clearance B1 may form the first and third liquid-vapor interfaces F1 and F3.

In addition, the upper end portion of the outer peripheral surface of the sleeve 150 may be bonded to the rotor hub 160.

Meanwhile, the sleeve 150 may have a lower inclined portion 154 formed in a lower end portion of the outer peripheral surface thereof so as to form a liquid-vapor interface together with the extension part 124 of the lower thrust member 130, and the lower inclined portion 154 may be inclined upwardly in the inner radial direction.

That is, the lower end portion of the sleeve 150 may be provided with the lower inclined portion 154 inclined upwardly in the inner radial direction such that a fourth liquid-vapor interface F4 may be formed in a space between the outer peripheral surface of the sleeve 150 and the extension part 134 of the lower thrust member 130.

As described above, since the fourth liquid-vapor interface F4 is formed in the space between the lower end portion of the sleeve 150 and the extension part 134, the lubricating fluid filling the lower bearing clearance B2 may form the second and fourth liquid-vapor interfaces F2 and F4.

In addition, the sleeve 150 may include a dynamic pressure generating groove 155 formed in the inner surface thereof in order to generate fluid dynamic pressure via the lubricating fluid filling the bearing clearances B1 and B2 at the time of rotation thereof. That is, the dynamic pressure generating groove 155 may include upper and lower dynamic pressure generating grooves 155a and 155b.

However, the dynamic pressure generating groove 155 is not limited to being formed in the inner surface of the sleeve 150, but may also be formed in the outer peripheral surface of the shaft 140.

Meanwhile, the sleeve 150 may include a connection hole 156 formed therein in order to connect an inner diameter portion thereof to the outer peripheral surface thereof.

The connection hole 156 may be inclined so as to connect the clearance formed by the upper inclined surface 142a of the depression groove 142 and the sleeve 150 to the clearance formed by the upper inclined portion 153 and the upper thrust member 170.

In addition, one end of the connection hole 156 may be disposed below the liquid-vapor interface formed in the space formed by the upper thrust member 170 and the upper inclined portion 153 of the sleeve 150. That is, one end of the connection hole 156 may be disposed below the third liquid-vapor interface F3 disposed in the space formed by the upper thrust member 170 and the upper inclined portion 153 of the sleeve 150.

In addition, the other end of the connection hole 156 may be disposed above the liquid-vapor interface formed in the space formed by the upper inclined surface 142a and the sleeve 150. That is, the other end of the connection hole 156 may be disposed above the first liquid-vapor interface F1 disposed in the space formed by the sleeve 150 and the upper inclined surface 142a of the depression groove 142.

Therefore, leakage of the lubricating fluid from the space formed by the upper thrust member 170 and the upper inclined portion 153 of the sleeve 150 at the time of excessive injection of the lubricating fluid may be suppressed.

In other words, at the time of the excessive injection of the lubricating fluid, the lubricating fluid may move downwardly from the space formed by the upper thrust member 170 and the upper inclined portion 153 of the sleeve 150. At this time, the lubricating fluid may be introduced into one end of the connection hole 156 and then move toward the first liquid-vapor interface F1 through the other end of the connection hole 156.

In addition, in the case in which an external impact is applied, the lubricating fluid may move along the outer peripheral surface of the sleeve 150. The lubricating fluid moving along the outer peripheral surface of the sleeve 150 may move toward the first liquid-vapor interface F1 through the connection hole 156 since one end of the connection hole 156 is disposed below the third liquid-vapor interface F3.

Therefore, the leakage of the lubricating fluid from the upper bearing clearance B1 may be suppressed.

The rotor hub 160 may be coupled to the sleeve 150 to thereby rotate together with the sleeve 150.

The rotor hub 160 may include a rotor hub body 162 including an insertion part 162a formed therein, the insertion part 152a having the upper thrust member 170 insertedly disposed in an inner portion thereof, a magnet mounting part 164 extended from an edge of the rotor hub body 162 and having a driving magnet 164a mounted on an inner surface thereof, and a disk seating part 166 extended from an edge of the magnet mounting part 164 in the outer radial direction.

Meanwhile, a lower end portion of an inner surface of the rotor hub body 162 may be bonded to an outer surface of the sleeve 150. That is, the lower end portion of the inner surface of the rotor hub body 162 may be bonded to the outer peripheral surface of the sleeve 150 by using an adhesive and/or welding.

Therefore, when the rotor hub 160 is rotated, the sleeve 150 may rotate together with the rotor hub 160.

In addition, the magnet mounting part 164 may be extended downwardly from the rotor hub body 162 in the axial direction. In addition, the magnet mounting part 164 may include the driving magnet 164a fixedly installed on an inner surface thereof.

The driving magnet 164a may have an annular ring shape and be a permanent magnet generating a magnetic field having predetermined strength by alternately magnetizing N and an S poles in the circumferential direction.

Meanwhile, the driving magnet 164a may be disposed to face a front end of the stator core 102 having a coil 101 wound therearound and generate driving force by electromagnetic interaction with the stator core 102 having the coil 101 wound therearound to thereby rotate the rotor hub 160.

That is, when power is supplied to the coil 101, the driving force rotating the rotor hub 160 is generated by the electromagnetic interaction between the stator core 102 having the coil 101 wound therearound and the driving magnet 164a disposed to face the stator core 102, such that the rotor hub 160 may rotate together with the sleeve 150.

Meanwhile, the upper thrust member 170 may be fixedly installed on the upper end portion of the shaft 140 and form the liquid-vapor interface together with the sleeve 150.

Meanwhile, the upper thrust member 170 may include a body 172 having an inner surface bonded to the shaft 140 and a protrusion part 174 extended from the body 172 to thereby form the liquid-vapor interface F3 together with the upper inclined portion 153.

The protrusion part 174 may be extended downwardly from the body 172 in the axial direction and have an inner surface disposed to face the upper inclined portion 153.

In addition, the protrusion part 174 may be extended from the body 172 so as to be in parallel with the shaft 140.

Further, the upper thrust member 170 may be insertedly disposed in a space formed by the upper end portion of the outer peripheral surface of the shaft 140, the outer surface of the sleeve 150, and the inner surface of the rotor hub 160.

In addition, the upper thrust member 170, which is a fixed member fixedly installed together with the base member 120, the lower thrust member 130, and the shaft 140, may form the stator 20.

Meanwhile, since the upper thrust member 170 is fixedly installed on the shaft 140 and the sleeve 150 rotates together with the rotor hub 160, when the sleeve 150 rotates, the third liquid-vapor interface F3 formed in a space between the upper inclined portion 153 of the sleeve 150 and the protrusion part 174 may be inclined toward the upper inclined portion 153 of the sleeve 150 by the rotation of the sleeve 150.

Therefore, scattering of the lubricating fluid may be reduced by centrifugal force.

In addition, the outer peripheral surface of the upper thrust member 170 and the inner surface of the rotor hub 160 disposed to face the outer peripheral surface of the upper thrust member 170 may forma labyrinth seal. That is, the outer surface of the upper thrust member 170 and the inner surface of the rotor hub body 162 may be spaced apart from each other by a predetermined interval and form the labyrinth seal so as to suppress the air in which the evaporated lubricating fluid is contained from moving toward the outside.

Therefore, the movement of the air containing the evaporated lubricating fluid to the outside is suppressed, whereby reduction in the lubricating fluid may be suppressed.

Meanwhile, a thrust dynamic pressure generating groove (not shown) for generating thrust dynamic pressure may be formed in at least one of a lower surface of the upper thrust member 170 and the upper surface of the sleeve 150 disposed to face the lower surface of the upper thrust member 170.

In addition, the upper thrust member 170 may also serve as a sealing member preventing the lubricating fluid filling the upper bearing clearance B1 from being leaked upwardly.

As described above, the leakage of the lubricating fluid from the space formed by the upper thrust member 170 and the upper inclined portion 153 of the sleeve 150 at the time of excessive injection of the lubricating fluid may be suppressed by the connection hole 156.

In other words, at the time of the excessive injection of the lubricating fluid, the lubricating fluid may move downwardly from the space formed by the upper thrust member 170 and the upper inclined portion 153 of the sleeve 150. At this time, the lubricating fluid may be introduced into one end of the connection hole 156 and then move toward the first liquid-vapor interface F1 through the other end of the connection hole 156.

In addition, in the case in which an external impact is applied, the lubricating fluid may move along the outer peripheral surface of the sleeve 150. The lubricating fluid moving along the outer peripheral surface of the sleeve 150 may move toward the first liquid-vapor interface F1 through the connection hole 156 since one end of the connection hole 156 is disposed below the third liquid-vapor interface F3.

Therefore, the leakage of the lubricating fluid from the upper bearing clearance B1 may be suppressed.

Hereinafter, a spindle motor according to another embodiment of the present invention will be described with reference to the accompanying drawings. However, a detail description of the same components as the above-mentioned components will be omitted.

Figure 3:
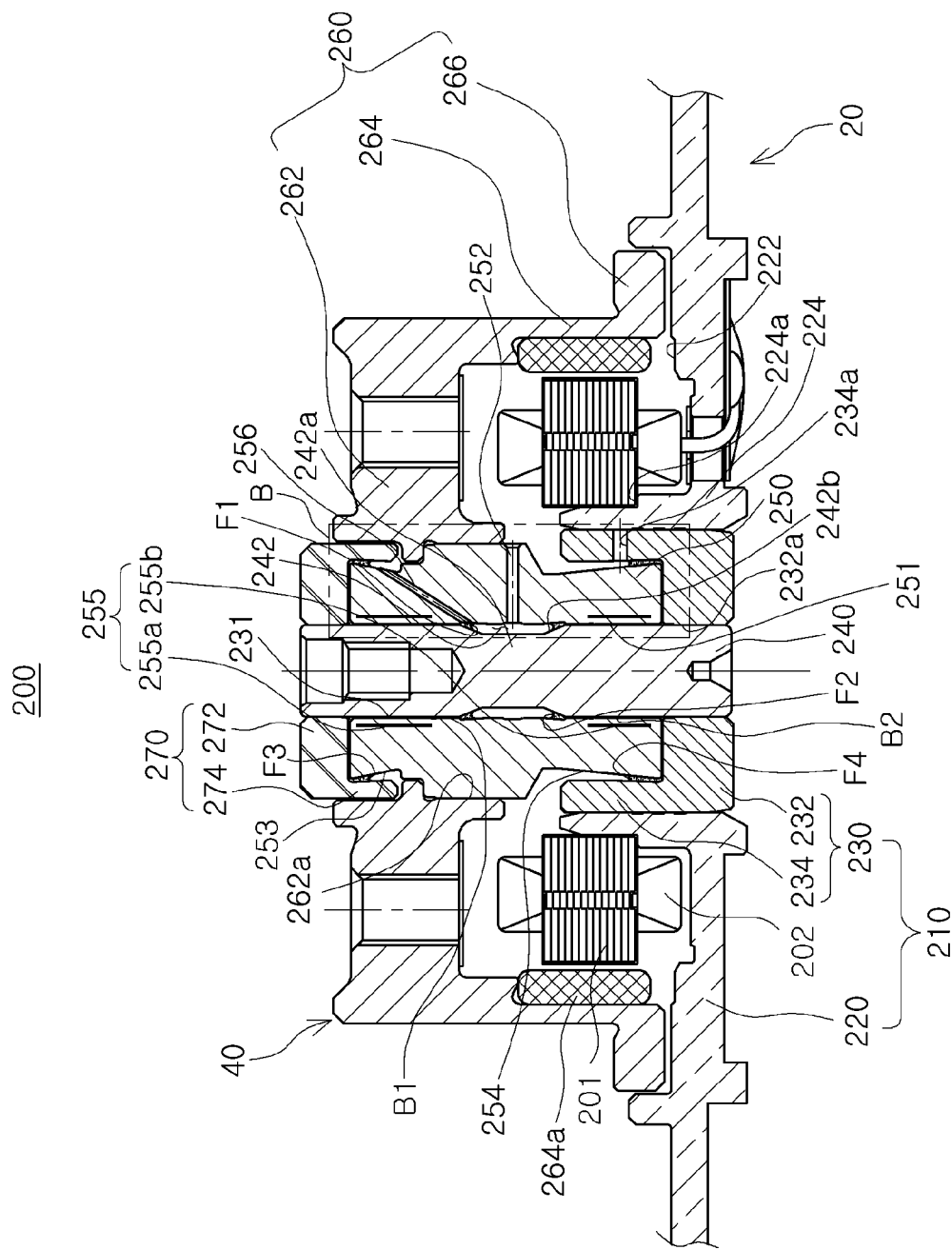
FIG. 3 is a schematic cross-sectional view showing a spindle motor according to another embodiment of the present invention.
Figure 4:
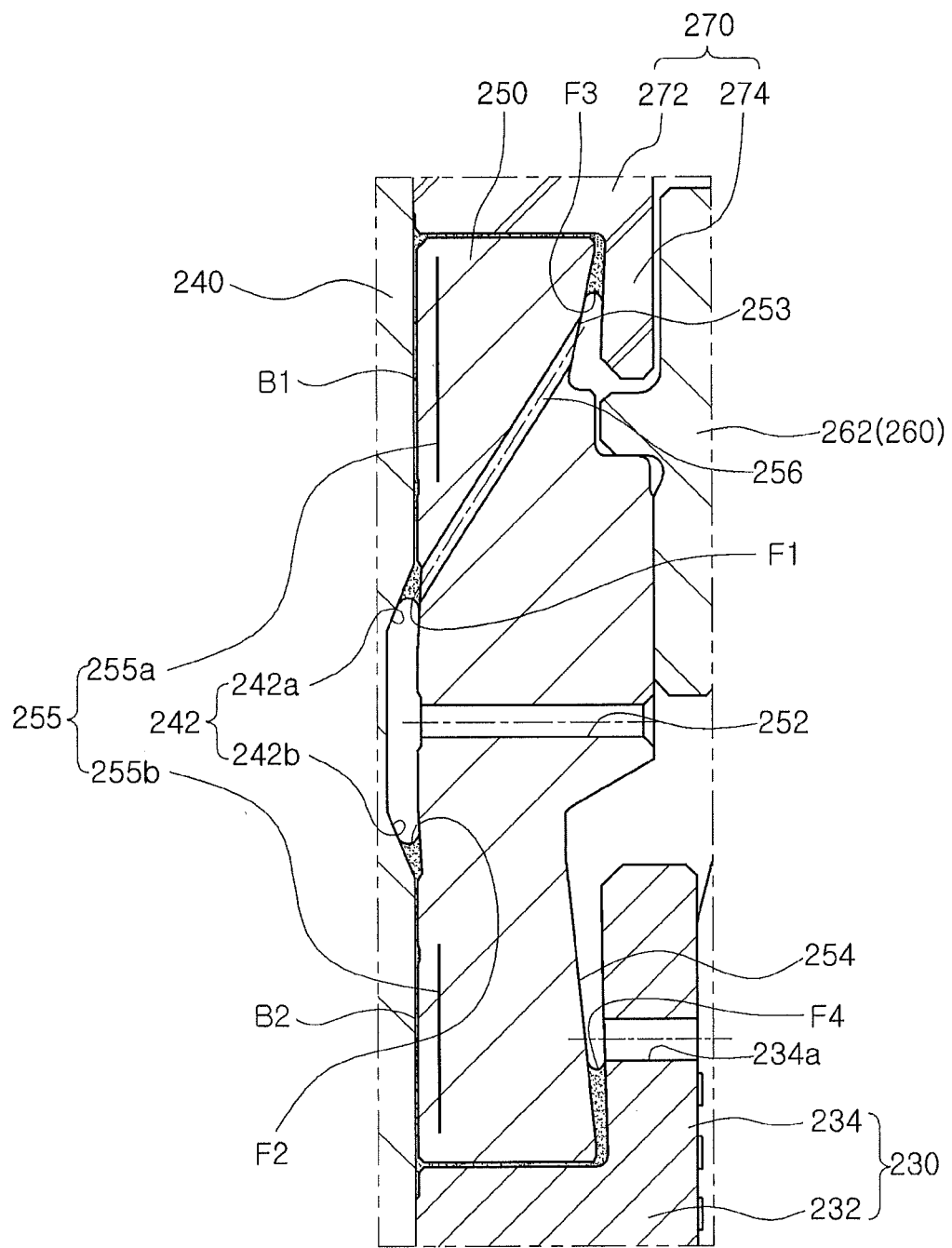
FIG. 4 is an enlarged view showing part B of FIG. 3.
Figure 5:
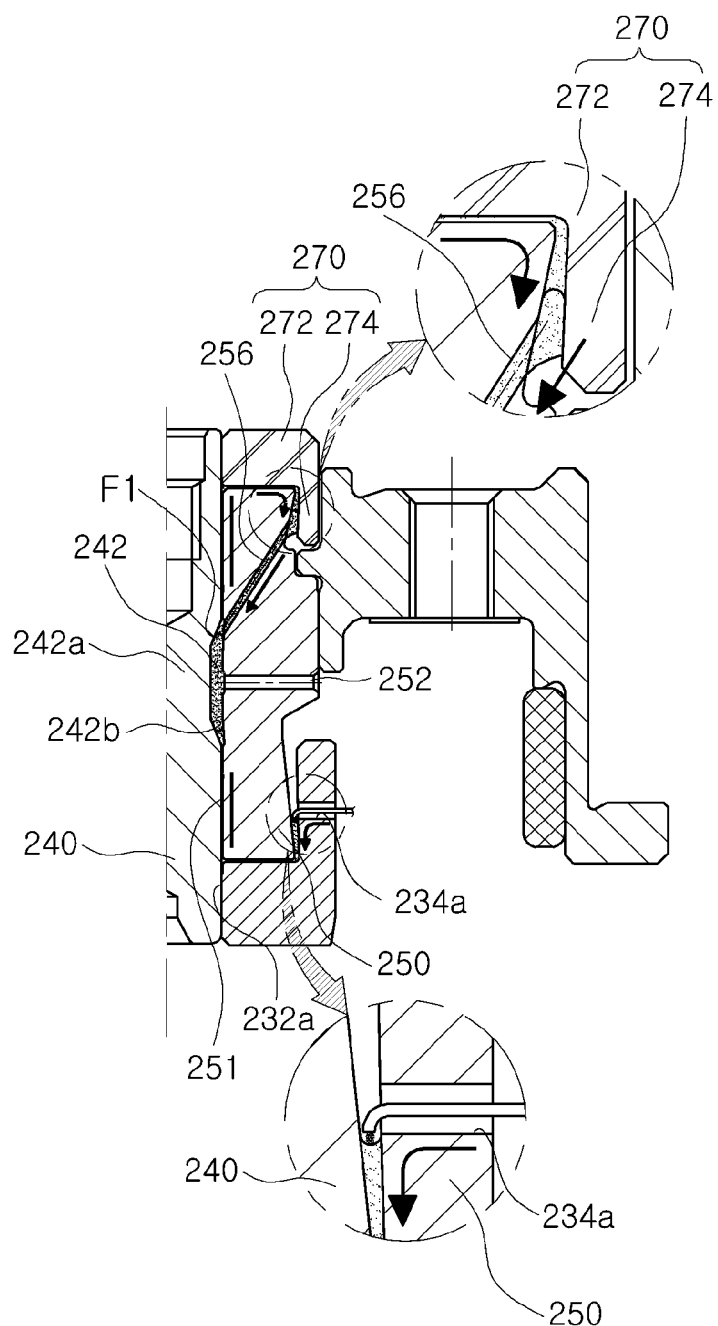
FIGS. 5 and 6 are views describing an operation of a spindle motor according to another embodiment of the present invention.
Figure 6:
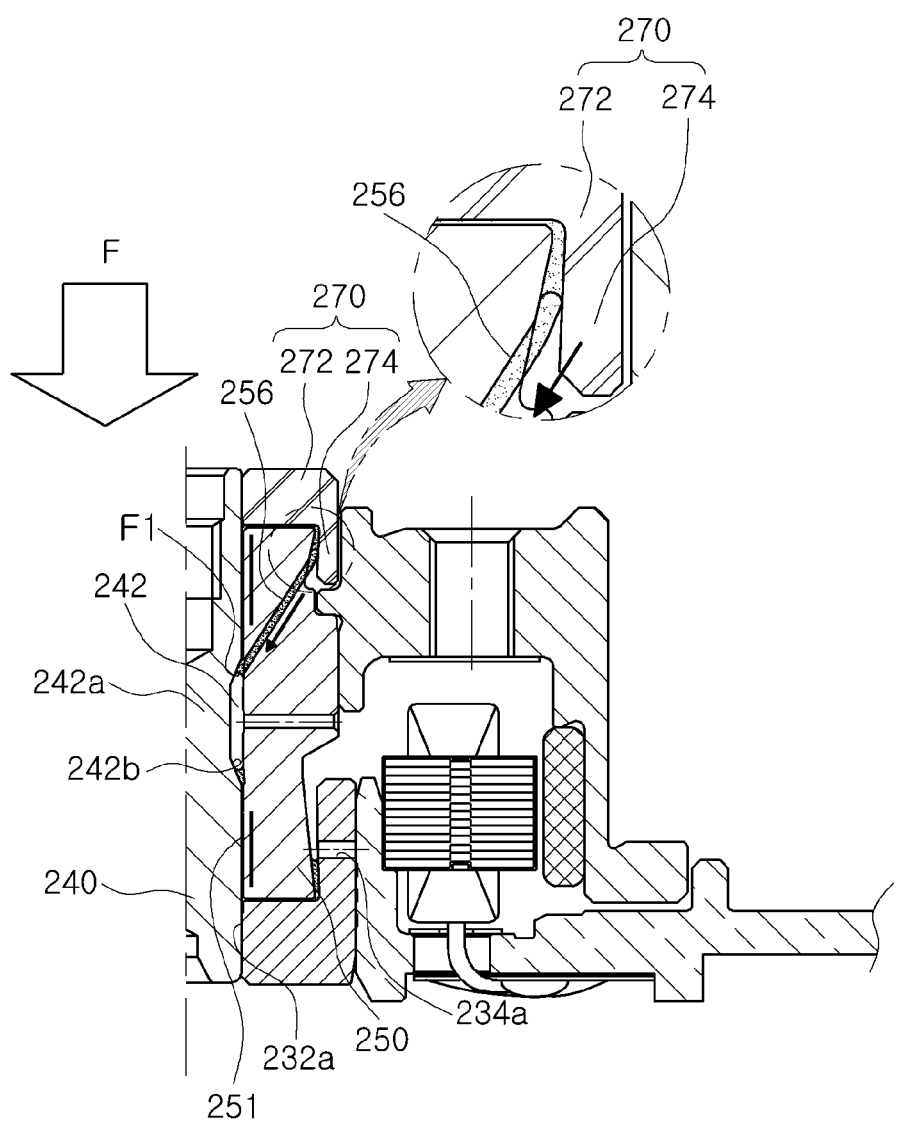

FIG. 3 is a schematic cross-sectional view showing a spindle motor according to another embodiment of the present invention; FIG. 4 is an enlarged view showing part B of FIG. 3; and FIGS. 5 and 6 are views describing an operation of the spindle motor according to another embodiment of the present invention.

Referring to FIGS. 3 through 6, a spindle motor 200 according to another embodiment of the present invention may include a base part 210 including a base member 220 and a lower thrust member 230, a shaft 240, a sleeve 250, a rotor hub 260, and an upper thrust member 270.

Meanwhile, the base member 220, the shaft 240, the sleeve 250, the rotor hub 260, and the upper thrust member 270 included in the spindle motor 200 according to this embodiment of the present invention substantially correspond to the base member 120, the shaft 140, the sleeve 150, the rotor hub 160, and the upper thrust member 170 included in the spindle motor 100 according to the above-described embodiment of the present invention. Therefore, a detailed description thereof will be omitted and be replaced by the above-mentioned description.

The lower thrust member 230 may be fixedly installed on the base member 220. That is, the lower thrust member 230 may be insertedly installed in a coupling part 224. More specifically, an outer peripheral surface of the lower thrust member 230 may be bonded to an inner peripheral surface of the coupling part 224.

Meanwhile, the lower thrust member 230 may include a disk part 232 having an inner surface fixedly installed on the shaft 240 and an outer surface fixedly installed on the base member 220 and an extension part 234 extended upwardly from the disk part 232 in the axial direction.

That is, the lower thrust member 230 may have a cup shape having a hollow part and may have a 'L' shaped cross section.

In addition, the disk part 232 may be provided with an installation hole 232a for installing the shaft 240, and the shaft 240 may be insertedly mounted in the installation hole 232a.

Meanwhile, the extension part 234 may include a through-hole 234a formed therein in order to allow for the insertion of a lubricating fluid. That is, after an injector (for example, a syringe) for the filling of the lubricating fluid is installed in the through-hole 234a formed in the extension part 234, the insertion of the lubricating fluid may be performed while a filling state of the lubricating fluid is visually confirmed from above.

Therefore, since the lubricating fluid may be inserted while an amount thereof is confirmed with the naked eye, a position at which an interface between the lubricating fluid and air is formed may be controlled.

In addition, the lower thrust member 230, together with the base member 220, may be included in the fixed member, that is, the stator 20.

Meanwhile, the outer surface of the lower thrust member 230 may be bonded to an inner surface of the base member 220 by using an adhesive and/or welding. In other words, the outer surface of the lower thrust member 230 may be fixedly bonded to an inner surface of the coupling part 224 of the base member 220.

In addition, a thrust dynamic pressure generating groove (not shown) for generating thrust fluid dynamic pressure may be formed in at least one of an upper surface of the lower thrust member 230 and a lower surface of the sleeve 250.

Further, the lower thrust member 230 may also serve as a sealing member for preventing the lubricating fluid from being leaked.

Meanwhile, as shown in FIG. 5, leakage of the lubricating fluid from a space formed by the upper thrust member 270 and an upper inclined portion 253 of the sleeve 250 at the time of excessive injection of the lubricating fluid may be suppressed by a connection hole 256.

In other words, at the time of the excessive injection of the lubricating fluid, the lubricating fluid may move downwardly from the space formed by the upper thrust member 270 and the upper inclined portion 253 of the sleeve 250. At this time, the lubricating fluid may be introduced into one end of the connection hole 256 and then move toward the first liquid-vapor interface F1 through the other end of the connection hole 256.

Then, a suction device is inserted into the communication hole 252 to suck a portion of the injected lubricating fluid, whereby the lubricating fluid may be separately filled in upper and lower bearing clearances B1 and B2.

In addition, in the case in which an external impact F is applied as shown in FIG. 6, the lubricating fluid may move along the outer peripheral surface of the sleeve 250. The lubricating fluid moving along the outer peripheral surface of the sleeve 250 may move toward the first liquid-vapor interface F1 through the connection hole 256 since one end of the connection hole 256 is disposed below the third liquid-vapor interface F3.

Therefore, the leakage of the lubricating fluid from the upper bearing clearance B1 may be suppressed.

As set forth above, according to the embodiments of the present invention, the excessive injection of the lubricating fluid is suppressed through the connection hole, whereby a position at which the interface between the lubricating fluid and the air is formed may be managed.

In addition, when an external impact is applied, the lubricating fluid is introduced into the upper bearing clearance through the connection hole, whereby the separation of the lubricating fluid from the bearing clearance may be suppressed.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
a base part including a base member and a lower thrust member fixedly installed on the base member;
a shaft having a lower end portion fixedly installed on the base part;
an upper thrust member fixedly installed on an upper end portion of the shaft;
a sleeve disposed between the upper and lower thrust members and rotatably installed on the shaft; and
a rotor hub fixedly installed on the sleeve to thereby rotate together therewith,
wherein the sleeve includes a connection hole formed therein in order to connect an inner diameter portion thereof to an outer peripheral surface thereof,
the shaft includes a depression groove recessed in a central portion of an outer peripheral surface thereof in a circumferential direction, the depression groove having upper and lower inclined surfaces provided in upper and lower portions thereof,
the sleeve forms upper and lower bearing clearances together with the shaft and the upper and lower thrust members,
the sleeve has upper and lower inclined portions provided in upper and lower portions of the outer peripheral surface thereof so as to form respective liquid-vapor interfaces together with the upper and lower thrust members, and
the connection hole is inclined so as to connect a clearance formed by the upper inclined surface and the sleeve to a clearance formed by the upper inclined portion of the sleeve and the upper thrust member.

2. The spindle motor of claim 1, wherein the connection hole is inclined, such that one end thereof is disposed below a liquid-vapor interface formed in a space formed by the upper thrust member and the upper inclined portion of the sleeve, and the other end thereof is disposed above a liquid-vapor interface formed in a space formed by the upper inclined surface and the sleeve.

3. The spindle motor of claim 1, wherein the sleeve includes a communication hole formed therein in order to allow a space formed by the depression groove and the shaft to be in communication with the outside of the sleeve.

4. The spindle motor of claim 1, wherein the lower thrust member includes a disk part provided with an installation hole into which the shaft is inserted and an extension part extended from the disk part, and the extension part has a through-hole formed therein in order to insert a lubricating fluid therethrough.

5. A spindle motor comprising:

a base part including a base member and a lower thrust member fixedly installed on the base member;

a shaft having a lower end portion fixedly installed on the base part;

an upper thrust member fixedly installed on an upper end portion of the shaft;

a sleeve disposed between the upper and lower thrust members, rotatably installed on the shaft, and forming upper and lower bearing clearances together with the shaft; and a rotor hub fixedly installed on the sleeve to thereby rotate together therewith, wherein the sleeve includes a connection hole formed therein in order to connect an inner diameter portion thereof to an outer peripheral surface thereof, and the lower thrust member includes a through-hole formed therein in order to control an interface between a lubricating fluid and air, the shaft includes a depression groove recessed in a central portion of an outer peripheral surface thereof in a circumferential direction, the depression groove having upper and lower inclined surfaces provided in upper and lower portions thereof, the sleeve forms upper and lower bearing clearances together with the shaft and the upper and lower thrust members, the sleeve has upper and lower inclined portions provided in upper and lower portions of the outer peripheral surface thereof so as to form respective liquid-vapor interfaces together with the upper and lower thrust members, and the connection hole is inclined so as to connect a clearance formed by the upper inclined surface and the sleeve to a clearance formed by the upper inclined portion of the sleeve and the upper thrust member.

6. The spindle motor of claim 5, wherein the sleeve includes a communication hole formed therein in order to allow a space formed by a depression groove and the shaft to be in communication with the outside of the sleeve.

* * * * *